(12) United States Patent
Fazeli et al.

(10) Patent No.: US 11,367,315 B2
(45) Date of Patent: Jun. 21, 2022

(54) DUAL-STAGE, SEPARATED GAS/FLUID SHOCK STRUT SERVICING MONITORING SYSTEM USING TWO PRESSURE/TEMPERATURE SENSORS

(71) Applicant: GOODRICH CORPORATION, Charlotte, NC (US)

(72) Inventors: Amir Fazeli, Mississauga (CA); Adnan Cepic, Mississauga (CA); Susanne M. Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 89 days.

(21) Appl. No.: 17/067,221

(22) Filed: Oct. 9, 2020

(65) Prior Publication Data

US 2021/0027551 A1  Jan. 28, 2021

Related U.S. Application Data

(62) Division of application No. 16/281,715, filed on Feb. 21, 2019, now Pat. No. 10,825,265, which is a
(Continued)

(51) Int. Cl.
*G07C 5/00* (2006.01)
*B64C 25/60* (2006.01)
(Continued)

(52) U.S. Cl.
CPC ............. *G07C 5/006* (2013.01); *B64C 25/60* (2013.01); *B64F 5/60* (2017.01); *F16F 9/062* (2013.01);
(Continued)

(58) Field of Classification Search
CPC ........ G07C 5/006; G07C 5/085; B64C 25/60; B64F 5/60; F16F 9/062; F16F 9/065;
(Continued)

(56) References Cited

U.S. PATENT DOCUMENTS

| 2,471,294 A | 5/1949 | Watts |
| 3,889,904 A | 6/1975 | Jones |

(Continued)

FOREIGN PATENT DOCUMENTS

| EP | 2937592 | 10/2015 |
| EP | 3118110 | 1/2017 |

(Continued)

OTHER PUBLICATIONS

European Patent Office, European Search Report dated Dec. 4, 2018 in Application No. 18181771.9.
(Continued)

*Primary Examiner* — Yuen Wong
(74) *Attorney, Agent, or Firm* — Snell & Wilmer L.L.P.

(57) ABSTRACT

A method for monitoring a dual-stage, separated gas/fluid shock strut includes receiving, by a controller, primary chamber temperature and pressure sensor readings, secondary chamber pressure and temperature sensor readings, and a shock strut stroke sensor reading, determining, by the controller, a shock strut stroke at which a secondary chamber is activated, calculating, by the controller, a volume of oil in an oil chamber of the shock strut, a primary chamber gas volume of, a number of moles of gas in, and a volume of oil leaked into, a primary gas chamber of the shock strut, a secondary chamber gas volume in, a volume of oil leaked into, and a number of moles of gas in, the secondary chamber, based upon at least one of the secondary chamber pressure sensor reading, and the secondary chamber temperature sensor reading.

9 Claims, 10 Drawing Sheets

Related U.S. Application Data division of application No. 15/642,098, filed on Jul. 5, 2017, now Pat. No. 10,269,188.

(51) Int. Cl.

| | |
|---|---|
| F16F 9/32 | (2006.01) |
| G01M 17/04 | (2006.01) |
| B64F 5/60 | (2017.01) |
| F16F 9/06 | (2006.01) |
| F16F 9/48 | (2006.01) |
| F16F 9/342 | (2006.01) |
| F16F 15/02 | (2006.01) |
| F16F 15/023 | (2006.01) |
| G07C 5/08 | (2006.01) |

(52) U.S. Cl.
CPC ............ *F16F 9/065* (2013.01); *F16F 9/3292* (2013.01); *F16F 9/486* (2013.01); *G01M 17/04* (2013.01); *F16F 9/342* (2013.01); *F16F 15/022* (2013.01); *F16F 15/023* (2013.01); *F16F 2222/12* (2013.01); *F16F 2230/0047* (2013.01); *F16F 2230/183* (2013.01); *F16F 2236/045* (2013.01); *G07C 5/085* (2013.01)

(58) Field of Classification Search
CPC .......... F16F 9/3292; F16F 9/486; F16F 9/342; F16F 15/022; F16F 15/023; F16F 2222/12; F16F 2230/0047; F16F 2230/183; F16F 2236/045; G01M 17/04
See application file for complete search history.

(56) References Cited

U.S. PATENT DOCUMENTS

| | | |
|---|---|---|
| 5,148,896 A | 9/1992 | Ralph |
| 5,548,517 A | 8/1996 | Nance |
| 6,120,009 A | 9/2000 | Gatehouse et al. |
| 6,201,508 B1 | 3/2001 | Metzen et al. |
| 6,293,141 B1 | 9/2001 | Nance |
| 6,676,076 B1 | 1/2004 | Davies |
| 7,193,530 B2 | 9/2007 | Nance |
| 7,552,803 B2 | 6/2009 | Luce |
| 7,716,964 B2 | 5/2010 | Kurtz et al. |
| 8,055,396 B2 | 11/2011 | Yates et al. |
| 8,056,392 B2 | 11/2011 | Ryan et al. |
| 8,180,504 B1 | 5/2012 | Nance |
| 8,262,019 B2 | 9/2012 | Schmidt |
| 8,275,515 B2 | 9/2012 | Wright et al. |
| 8,565,968 B2 | 10/2013 | Nance |
| 8,886,402 B1 | 11/2014 | Lou |
| 8,919,182 B2 | 12/2014 | Luce |
| 9,045,237 B2 | 6/2015 | Nance |
| 9,285,007 B2 | 3/2016 | Fazeli et al. |
| 9,342,481 B2 | 5/2016 | Sweringen et al. |
| 9,387,924 B2 | 7/2016 | Fazeli et al. |
| 9,446,859 B2 | 9/2016 | Fazeli et al. |
| 9,541,151 B2 | 1/2017 | Martin et al. |
| 2007/0069072 A1 | 3/2007 | Luce |
| 2008/0033607 A1 | 2/2008 | Zeliff |
| 2009/0309674 A1 | 12/2009 | Girard et al. |
| 2014/0046533 A1 | 2/2014 | Nance |
| 2015/0266569 A1 | 9/2015 | Fazeli et al. |
| 2015/0267769 A1 | 9/2015 | Fazeli et al. |
| 2015/0269794 A1 | 9/2015 | Fazeli et al. |
| 2016/0027225 A1 | 1/2016 | Fazeli et al. |
| 2016/0101877 A1 | 4/2016 | Shepherd et al. |
| 2016/0230831 A1 | 8/2016 | Martin |
| 2016/0240907 A1 | 8/2016 | Haroun |
| 2017/0008647 A1* | 1/2017 | Pountney ................ B64C 25/60 |
| 2017/0008648 A1 | 1/2017 | Pountney et al. |
| 2017/0098889 A1 | 4/2017 | Henry et al. |
| 2017/0166329 A1* | 6/2017 | Fazeli .................... B64F 5/0045 |

FOREIGN PATENT DOCUMENTS

| | | |
|---|---|---|
| EP | 3184423 | 6/2017 |
| WO | 2014184521 | 11/2014 |

OTHER PUBLICATIONS

European Patent Office, European Search Report dated Dec. 14, 2018 in Application No. 18181990.5.
USPTO, Notice of Allowance Action dated Dec. 18, 2018 in U.S. Appl. No. 15/642,058.
USPTO, Notice of Allowance Action dated Dec. 18, 2018 in U.S. Appl. No. 15/642,117.
USPTO, Notice of Allowance dated Dec. 18, 2018 in U.S. Appl. No. 15/642,129.
USPTO, Pre-Interview First Office Action dated Dec. 20, 2018 in U.S. Appl. No. 15/642,081.
European Patent Office, European Search Report dated Jan. 2, 2019 in Application No. 18181905.3.
European Patent Office, European Search Report dated Oct. 29, 2018 in Application No. 18181983.0-1010.
European Patent Office, European Search Report dated Aug. 24, 2018 in Application No. 18163431.2-1013.
USPTO, First Action Interview Office Action dated Aug. 28, 2018 in U.S. Appl. No. 15/642,117.
USPTO, First action Interview Office Action dated Aug. 28, 2018 in U.S. Appl. No. 15/642,129.
USPTO, Non-Final Office Action dated Sep. 11, 2018 in U.S. Appl. No. 15/642,058.
USPTO, Pre-Interview First Office Action dated Jul. 25, 2018 in U.S. Appl. No. 15/642,117.
USPTO, Pre-Interview First Office Action dated Jul. 25, 2018 in U.S. Appl. No. 15/642,129.
USPTO, Non Final Office Action dated Apr. 16, 2018 in U.S. Appl. No. 15/642,058.
Fazeli et al., "Dual-Stage, Pressure-Activated, Mixed Fluid Gas Shock Strut Servicing Monitoring System", U.S. Appl. No. 15/642,058, filed Jul. 5, 2017.
Fazeli et al., "Dual-Stage, Separated Gas/Fluid Shock Strut Servicing", U.S. Appl. No. 15/642,081, filed Jul. 5, 2017.
Fazeli et al., "Dual-Stage, Stroke-Activated, Mixed Fluid Gas Shock Strut Servicing Monitoring System", U.S. Appl. No. 15/642,117, filed Jul. 5, 2017.
Fazeli et al., "Dual-Stage, Separated Gas/Fluid Shock Strut Servicing Monitoring System Using One Pressure/Temperature Sensor", U.S. Appl. No. 15/642,129, filed Jul. 5, 2017.
USPTO: Pre-Interview Office Action issued in U.S. Appl. No. 15/642,098 dated Jul. 25, 2018.
USPTO: First Action Interview Office Action issued in U.S. Appl. No. 15/642,098 dated Aug. 28, 2018.
USPTO: Notice of Allowance issued in U.S. Appl. No. 15/642,098 dated Dec. 17, 2018.
USPTO: First Action Interview Office Action issued in U.S. Appl. No. 15/642,081 dated Feb. 8, 2019.
Fazeli et al., "Dual-Stage, Separated Gas/Fluid Shock Strut Servicing Monitoring System Using One Pressure/Temperature Sensor", U.S. Appl. No. 16/281,715, filed Feb. 21, 2019.
USPTO: Final Office Action issued in U.S. Appl. No. 15/642,081 dated Jun. 14, 2019.
USPTO: Advisory Action issued in U.S. Appl. No. 15/642,081 dated Aug. 22, 2019.
USPTO: Non-Final Office Action issued in U.S. Appl. No. 15/642,081 dated Dec. 11, 2019.
USPTO: Notice of Allowance issued in U.S. Appl. No. 15/642,081 dated Apr. 21, 2020.
USPTO: Notice of Allowance issued in U.S. Appl. No. 16/281,715 dated Sep. 10, 2020.
Fazeli et al., "Dual-Stage, Stroke-Activated, Mixed Fluid Gas Shock Strut Servicing Monitoring System", U.S. Appl. No. 15/642,098, filed Jul. 5, 2017.
European Patent Office, European Search Report dated Nov. 15, 2019 in Application No. 19190285.7.

(56) References Cited

OTHER PUBLICATIONS

European Patent Office, European Search Report dated Nov. 15, 2019 in Application No. 19190312.9.
European Patent Office, European Office Action dated Nov. 24, 2020 in Application No. 19190285.7.

* cited by examiner

DUAL-STAGE, SEPARATED GAS/FLUID SHOCK STRUT SERVICING MONITORING SYSTEM USING TWO PRESSURE/TEMPERATURE SENSORS

CROSS REFERENCE TO RELATED APPLICATIONS

This application is a divisional of, and claims priority to, and the benefit of U.S. patent application Ser. No. 16/281,715, filed on Feb. 21, 2019, and entitled "DUAL-STAGE, SEPARATED GAS/FLUID SHOCK STRUT SERVICING MONITORING SYSTEM USING TWO PRESSURE/TEMPERATURE SENSORS," which is a divisional of U.S. patent application Ser. No. 15/642,098, filed on Jul. 5, 2017, and entitled "DUAL-STAGE, SEPARATED GAS/FLUID SHOCK STRUT SERVICING MONITORING SYSTEM USING TWO PRESSURE/TEMPERATURE SENSORS" which are incorporated by reference herein in their entirety.

FIELD

The present disclosure relates to landing gear, and more particularly, to systems and methods for monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Performance of the shock strut assembly may degrade over time. Such degradation can cause damage to other components of the aircraft, including bearings of the landing gear assembly.

Functionality and performance of a landing gear shock strut depends on internal gas and oil levels. Gas pressure and oil volume may be maintained within a design envelope to ensure that the landing gear functionality is within an acceptable range.

SUMMARY

A monitoring system for a dual-stage, separated gas/fluid shock strut is disclosed herein, in accordance with various embodiments. The monitoring system for a dual-stage, separated gas/fluid gas shock strut may comprise a controller; and a tangible, non-transitory memory configured to communicate with the controller, the tangible, non-transitory memory having instructions stored thereon that, in response to execution by the controller, cause the controller to perform operations comprising: receiving, by the controller, a primary chamber temperature sensor reading; receiving, by the controller, a primary chamber pressure sensor reading; receiving, by the controller, a secondary chamber pressure sensor reading; receiving, by the controller, a shock strut stroke sensor reading; determining, by the controller, a shock strut stroke at which a secondary chamber of the shock strut is activated; calculating, by the controller, a volume of oil in an oil chamber of the shock strut; calculating, by the controller, a primary chamber gas volume in a primary chamber of the shock strut; and calculating, by the controller, a primary chamber oil leakage volume of oil leaked into the primary chamber of the shock strut.

In various embodiments, the instructions may cause the controller to perform further operations comprising calculating, by the controller, a number of moles of gas in the primary chamber of the shock strut, based upon at least the primary chamber gas volume. The instructions may cause the controller to perform further operations comprising: receiving, by the controller, a secondary chamber temperature sensor reading; calculating, by the controller, a secondary chamber gas volume in the secondary chamber; and calculating, by the controller, a volume of oil leaked into the secondary chamber of the shock strut, based upon a nominal volume, based upon at least one of the secondary chamber pressure sensor reading, the secondary chamber temperature sensor reading, a displaced volume of the secondary chamber, and a total volume of the secondary chamber. The instructions may cause the controller to perform further operations comprising calculating, by the controller, a number of moles of gas in the secondary chamber of the shock strut, based upon at least the secondary chamber gas volume. The instructions cause the controller to perform further operations comprising calculating, by the controller, the displaced volume of the secondary chamber of the shock strut. The instructions may cause the controller to perform further operations comprising comparing, by the controller, the volume of oil in the oil chamber with a plurality of threshold values, and issuing, by the controller, a servicing message, in response to the comparing. The instructions may cause the controller to perform further operations comprising comparing, by the controller, the number of moles of gas in the primary chamber with a plurality of threshold values, and issuing, by the controller, a servicing message, in response to the comparing. The instructions may cause the controller to perform further operations comprising comparing, by the controller, the number of moles of gas in the secondary chamber with a plurality of threshold values, and issuing, by the controller, a servicing message, in response to the comparing. The instructions cause the controller to perform further operations comprising comparing, by the controller, the volume of oil leaked into the primary chamber with a plurality of threshold values, and issuing, by the controller, a servicing message, in response to the comparing. The instructions may cause the controller to perform further operations comprising comparing, by the controller, the volume of oil leaked into the secondary chamber with a plurality of threshold values, and issuing, by the controller, a servicing message, in response to the comparing. The controller may be in electronic communication with a first pressure/temperature sensor for the primary chamber, a second pressure/temperature sensor for a secondary chamber, and a stroke sensor. The instructions may cause the controller to perform further operations comprising adjusting the volume of oil in the oil chamber to a reference temperature. The instructions may cause the controller to perform further operations comprising calculating, by the controller, a deviation of the volume of oil in the primary chamber from a nominal oil volume for the oil chamber.

A dual-stage, separated gas/fluid shock strut arrangement is disclosed herein in accordance with various embodiments. The dual-stage, separated gas/fluid shock strut arrangement may comprise a dual-stage, separated gas/fluid shock strut and a monitoring system. The dual-stage, separated gas/fluid shock strut may comprise a strut cylinder, a strut piston operatively coupled to the strut cylinder, an oil chamber, a primary gas chamber, and a secondary gas chamber. The monitoring system may comprise a first pressure/temperature sensor mounted to the primary gas chamber, a second pressure/temperature sensor mounted to the secondary gas chamber, a stroke sensor, a recorder configured to receive a plurality of sensor readings from at least one of the first pressure/temperature sensor, the second pressure/temperature sensor, and the stroke sensor, a landing detector configured to detect a landing event based upon a stroke sensor reading received from the stroke sensor, and a health monitor configured to determine a volume of oil in the oil chamber, a primary chamber gas volume in the primary gas chamber, and a secondary chamber gas volume in the secondary gas chamber.

In various embodiments, the monitoring system may further comprise a take-off detector configured to detect a take-off event based upon the stroke sensor reading received from the stroke sensor. The primary gas chamber may be separated from the oil chamber by a first separator piston and the secondary gas chamber is separated from the oil chamber by a second separator piston. The monitoring system may further comprise a counter configured to prevent at least one of the landing detector and the take-off detector from receiving data from the recorder for a predetermined duration, and a data logger configured to receive data from the health monitor. The health monitor may calculate a shock strut stroke at which the secondary chamber of the shock strut is activated based upon a primary chamber pressure and a secondary chamber pressure. The stroke sensor may be mounted to the shock strut.

A method for monitoring a dual-stage, separated gas/fluid shock strut is disclosed herein, in accordance with various embodiments. The method may comprise: receiving, by a controller, a primary chamber temperature sensor reading; receiving, by the controller, a primary chamber pressure sensor reading; receiving, by the controller, a secondary chamber pressure sensor reading; receiving, by the controller, a secondary chamber temperature sensor reading; receiving, by the controller, a shock strut stroke sensor reading; determining, by the controller, a shock strut stroke at which a secondary chamber is activated; calculating, by the controller, a volume of oil in an oil chamber of the shock strut; calculating, by the controller, a primary chamber gas volume in a primary gas chamber of the shock strut; calculating, by the controller, a number of moles of gas in the primary chamber of the shock strut; calculating, by the controller, a volume of oil leaked into the primary chamber of the shock strut; calculating, by the controller, a secondary chamber gas volume in a secondary chamber of the shock strut; calculating, by the controller, a volume of oil leaked into the secondary chamber of the shock strut; and calculating, by the controller, a number of moles of gas in the secondary chamber, based upon at least one of the secondary chamber pressure sensor reading, and the secondary chamber temperature sensor reading.

In various embodiments, the method may further comprise: calculating, by the controller, a displaced volume of the primary chamber; calculating, by the controller, a displaced volume of the secondary chamber; and issuing, by the controller, a servicing message.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
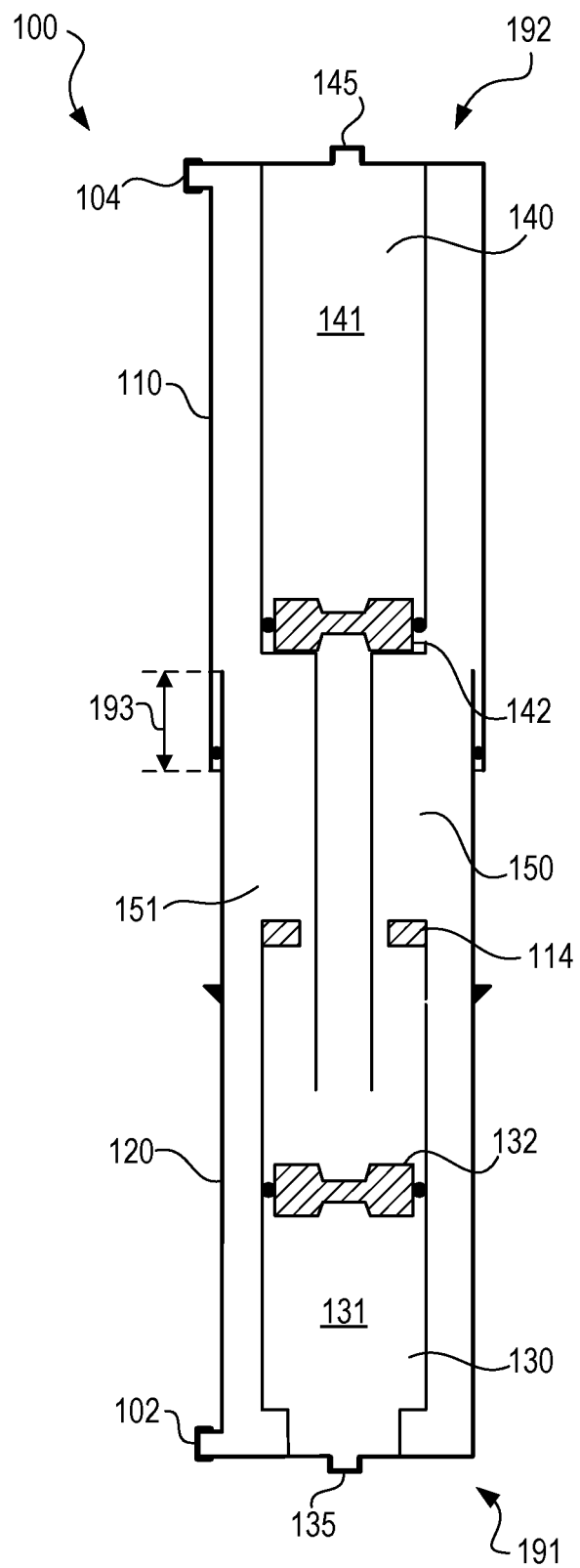
FIG. 1 illustrates a functional schematic view of a dual-stage, separated gas/fluid shock strut at a stroke of zero (0) (or maximum extension), in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

A shock strut gas pressure and stroke in static condition may be measured and any deviation from the shock strut theoretical static airspring curve typically may be compensated by re-servicing the shock strut with gas. Such an approach may be taken to reduce maintenance time associated with just adding gas to the shock strut. However, said approach assumes the deviation from static airspring curve is solely due to gas loss and therefore could overlook an oil leak in the system.

Aircraft landing gear systems in accordance with the present disclosure may comprise a shock strut. A shock strut may comprise various fluids such as oil and gas. Performance of the shock strut may be evaluated by monitoring aspects of the shock strut, including primary chamber gas temperature, primary chamber gas pressure, secondary chamber gas temperature, secondary chamber gas pressure, and shock strut stroke of the shock strut at various points during operation of the aircraft. Stroke may refer to a shock strut piston position relative to a shock strut cylinder.

A monitoring system, as provided herein, may comprise two integrated pressure/temperature sensors installed on the primary and secondary gas chambers of a dual-stage, separated gas/fluid shock strut, a stroke sensor that directly or indirectly measures the shock strut stroke, and an electronic control unit that executes a monitoring algorithm. The monitoring algorithm may use transient gas pressure and gas temperature during landing or takeoff and quantifies the oil and gas levels in the shock strut. Moreover, the monitoring system may estimate oil leakage into the gas chamber. The monitoring algorithm may issue a servicing message based on the shock strut estimated fluid and gas levels.

Because oil and gas levels may be determined independently, said levels can be used for diagnostic and prognostic purposes. The rate of oil or gas loss may be used to schedule future servicing.

The following nomenclature in table 1 and table 2 corresponds to various equations and parameters described in the present disclosure:

TABLE 1

| | Measurements |
|---|---|
| | Measurements |
| $\hat{P}_{primary}$ | Primary chamber gas pressure sensor reading |
| $\hat{T}_{primary}$ | Primary chamber gas temperature sensor reading |
| $\hat{P}_{secondary}$ | Secondary chamber gas pressure sensor reading |
| $\hat{T}_{secondary}$ | Secondary chamber gas temperature sensor reading |
| $\hat{S}$ | Shock strut stroke sensor reading |
| $\hat{P}_{primary}(0)$ | Primary chamber pressure sensor reading at a shock strut stroke of 0 (or near 0) (e.g., 25% of maximum stroke or less) |
| $\hat{T}_{primary}(0)$ | Primary chamber temperature sensor reading at a shock strut stroke of 0 (or near 0) |
| $\hat{P}_{secondary}(0)$ | Secondary chamber pressure sensor reading at a shock strut stroke of 0 (or near 0) |
| $\hat{T}_{secondary}(0)$ | Secondary chamber temperature sensor reading at a shock strut stroke of 0 (or near 0) |
| $\hat{P}_{primary}(S)$ | Primary chamber pressure sensor reading at a shock strut stroke of S |
| $\hat{P}_{primary}(S_{activation})$ | Primary chamber pressure sensor reading at the secondary chamber activation stroke |
| $\hat{P}_{primary,\,max}$ | Maximum primary chamber pressure during landing |
| $\hat{S}_{primary,\,max}$ | Shock strut stoke at which primary chamber reaches its maximum level |
| $\hat{P}_{secondary@\hat{S}primary,\,max}$ | Secondary gas pressure at the shock strut stroke of $\hat{S}_{primary,\,max}$ |

TABLE 2

| | Algorithm Internal Parameters |
|---|---|
| | Algorithm Internal Parameters |
| $A_p$ | Shock strut piston area |
| $S_{activation}$ | Estimated activation stroke of the secondary chamber |
| $\overline{V}_{oil}$ | Optimization algorithm guess for oil volume |
| $V_{oil}(0)$ | Estimated oil volume at a shock strut stroke of 0 |

TABLE 2-continued

| Algorithm Internal Parameters | |
|---|---|
| $\overline{P}_{primary}(S_{activation})$ | Calculated Primary chamber pressure at the secondary chamber activation stroke |
| $V_{tot}$ | Total internal volume of the shock strut in the fully extended position |
| $V_{secondary\_chamber\_nom}$ | Secondary chamber nominal internal volume at the shock strut stroke of 0 |
| $V_{primary\_chamber}(0)$ | Estimated primary chamber internal volume at the shock strut stroke of 0 (or near 0) (e.g., 25% of maximum stroke or less) |
| Z | Nitrogen compressibility factor |
| R | Ideal gas constant |
| β | Oil bulk modulus |
| $V_{oil}(\hat{S}_{primary,\,max})$ | Oil volume at the shock strut stroke of $\hat{S}_{primary,\,max}$ |
| $V_{primary+secondary}(\hat{S}_{primary,\,max})$ | Total volume of primary and secondary chambers at the shock strut stroke of $\hat{S}_{primary,\,max}$ |
| $\Delta V_{primary\,chamber}$ | Optimization algorithm guess for primary chamber displacement volume |
| $\overline{P}_{primary,\,max}$ | Calculated primary chamber pressure at the shock strut stroke of $\hat{S}_{primary,\,max}$ |
| $\overline{V}_{primary\_Chamber}(\hat{S}_{primary,\,max})$ | Calculated primary chamber volume at the shock strut stroke of $\hat{S}_{primary,\,max}$ |
| $V_{primary\_chamber\_dead}$ | Primary chamber nominal dead volume |
| $V_{primary\_chamber\_leakage}$ | Calculated oil leakage volume into the primary chamber |
| $\overline{V}_{secondary\_chamber}(\hat{S}_{primary,\,max})$ | Calculated secondary chamber volume at the shock strut stroke of $\hat{S}_{primary,\,max}$ |
| $\Delta V_{secondary\,chamber}$ | Calculated secondary chamber displacement volume |
| $V_{secondary\_chamber\_leakage}$ | Calculated oil leakage volume into the secondary chamber |
| $\overline{P}_{secondary@\hat{S}primary,\,max}$ | Estimated secondary chamber pressure at the shock strut stroke of $\hat{S}_{primary,\,max}$ |
| $n_{primary\_chamber}$ | Primary chamber calculated number of moles of gas |
| $n_{secondary\_chamber}$ | Secondary chamber calculated number of moles of gas |
| $T_{ref}$ | Reference temperature |
| dT | Numerical integration step |
| α | Oil thermal expansion coefficient |
| $V_{oil\,nom}$ | Nominal oil volume |
| $V_{oil@T_{ref}}$ | Oil volume at $T_{ref}$ |
| $V_{threshold}$ | Oil volume threshold |
| $P_{primary\_nom}$ | Primary chamber nominal pressure |
| $V_{primary\_chamber\_nom}$ | Primary chamber nominal volume |
| $n_{primary\_chamber\_nominal}$ | Primary chamber nominal number of moles |
| $n_{primary,\,threshold}$ | Primary chamber threshold |
| $P_{secondary\_nom}$ | Secondary chamber nominal pressure |
| $V_{secondary\_chamber\_nom}$ | Secondary chamber nominal volume |
| $n_{secondary\_chamber\_nominal}$ | Secondary chamber nominal number of moles |
| $n_{secondary,\,threshold}$ | Secondary chamber threshold |
| $S_{min,\,takeoff}$ | Minimum shock strut stroke parameter for determining a takeoff event |
| $S_{max,\,takeoff}$ | Maximum shock strut stroke parameter for determining a takeoff event |

In various embodiments, a monitoring system for a dual-stage, separated gas/fluid shock strut is provided herein. A functional schematic view of such a shock strut is presented in FIG. 1.

With reference to FIG. 1, a dual-stage, separated gas/fluid shock strut (shock strut) 100 is illustrated, in accordance with various embodiments. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary gas chamber 130 in which gas is contained. In this regard, a volume of gas (also referred to herein as a primary chamber gas volume) 131 may be contained within primary gas chamber 130. Shock strut 100 may further consist of a high pressure, secondary gas chamber 140. In this regard, a volume of gas 141 (also referred to herein as a secondary chamber gas volume) may be contained within secondary gas chamber 140. The volume of gas 131 may be at a lower pressure than the volume of gas 141 when shock strut 100 is in the fully extended position (i.e., at a shock strut stroke 193 of zero). Primary gas chamber 130 may be located at a first end 191 of shock strut 100. First end 191 may be the bottom of shock strut 100. Secondary gas chamber 140 may be located at a second end 192 of shock strut 100. Second end 192 may be the top of shock strut 100.

Shock strut 100 may further consist of an oil chamber 150. In this regard, a volume of oil (also referred to herein as an oil chamber oil volume) 151 may be contained within oil chamber 150. Primary gas chamber 130 may be separated from oil chamber 150 via a separator piston (also referred to herein as a first separator piston) 132. Secondary gas chamber 140 may be separated from oil chamber 150 via a separator piston (also referred to herein as a second separator piston) 142. Separator piston 142 may translate within secondary gas chamber 140. FIG. 1 illustrates separator piston 142 at a minimum compression stroke (also referred to as being "bottomed out"). Stated differently, with shock strut 100 in the fully extended position, separator piston 142 may be located in a position such that the volume of secondary gas chamber 140 is at its maximum value. When separator piston 142 is bottomed out, it may be mechanically prevented from translating towards first end 191.

Shock strut 100 may further consist of an orifice plate 114. Orifice plate 114 may be located in oil chamber 150. Shock strut 100 may comprise an oil charge port 102 in fluid communication with oil chamber 150. Shock strut 100 may comprise an oil bleed port 104 in fluid communication with oil chamber 150. Shock strut 100 may comprise a primary chamber gas charge port 135 in fluid communication with primary gas chamber 130. Shock strut 100 may comprise a secondary chamber gas charge port 145 in fluid communication with secondary gas chamber 140.

Figure 2:
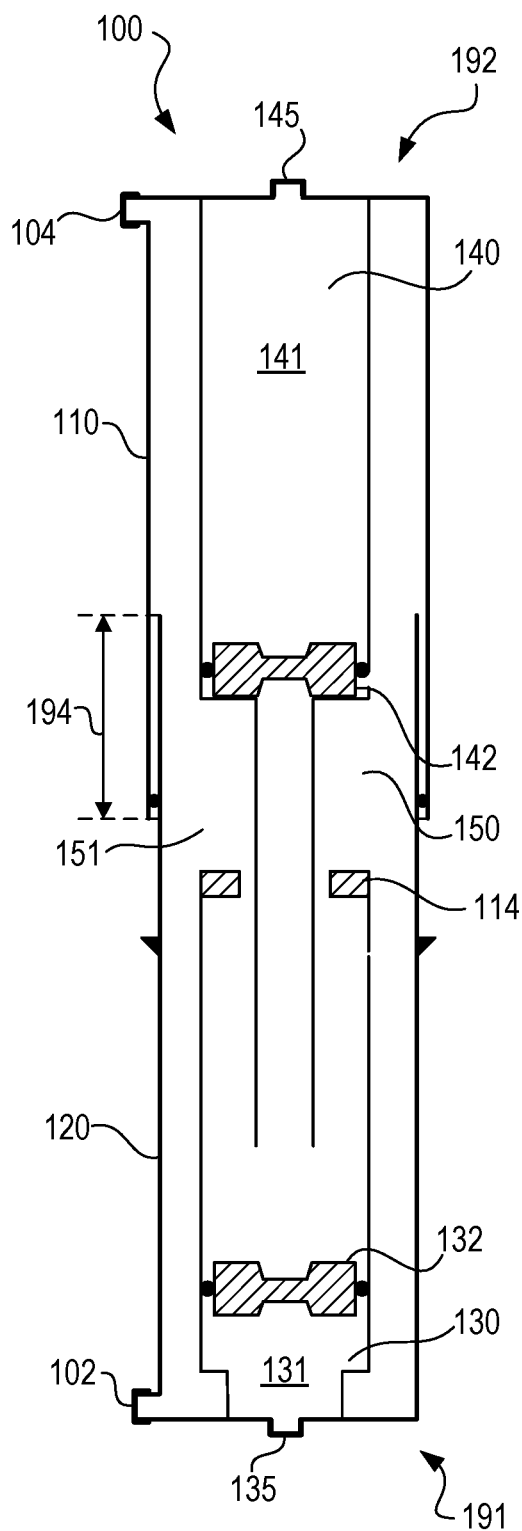
FIG. 2 illustrates a schematic view of the dual-stage, separated gas/fluid shock strut of FIG. 1 at a secondary gas chamber activation stroke ($S_{activation}$), in accordance with various embodiments.
Figure 3:
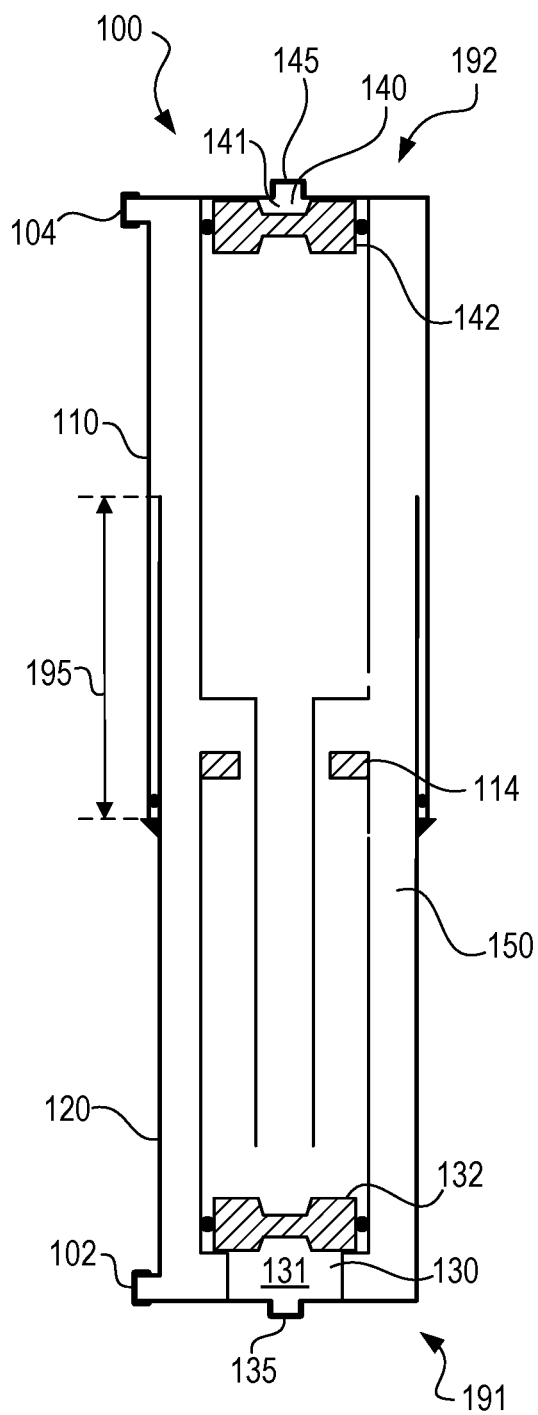
FIG. 3 illustrates a schematic view of the dual-stage, separated gas/fluid shock strut of FIG. 1 at a maximum stroke ($S_{max}$) (fully compressed position or zero extension), in accordance with various embodiments.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, separated gas/fluid shock strut by metering oil through orifice plate 114 and compressing the volume of gas 131 in primary gas chamber 130. The compression of primary gas chamber 130 may continue until the pressure in primary gas chamber 130 is equal to or greater than the pressure of the volume of gas 141 within secondary gas chamber 140. As illustrated in FIG. 2, this occurs at a shock strut stroke 194, (i.e., S activation) of between zero and the maximum shock strut stroke, $S_{max}$. Separator piston 132 may translate towards first end 191 as shock strut 100 is compressed. Once the secondary gas chamber 140 is activated, further compression of the shock strut may compress the volume of gas 141 in the secondary gas chamber 140, as illustrated in FIG. 3. FIG. 3 illustrates shock strut 100 in a fully compressed position, or at a maximum shock strut stroke 195 (i.e., $S_{max}$). FIG. 3 illustrates separator piston 132 at a maximum compression stroke (also referred to as being "bottomed out"). When separator piston 132 is bottomed out, it may be mechanically prevented from translating towards first end 191.

Figure 4A:
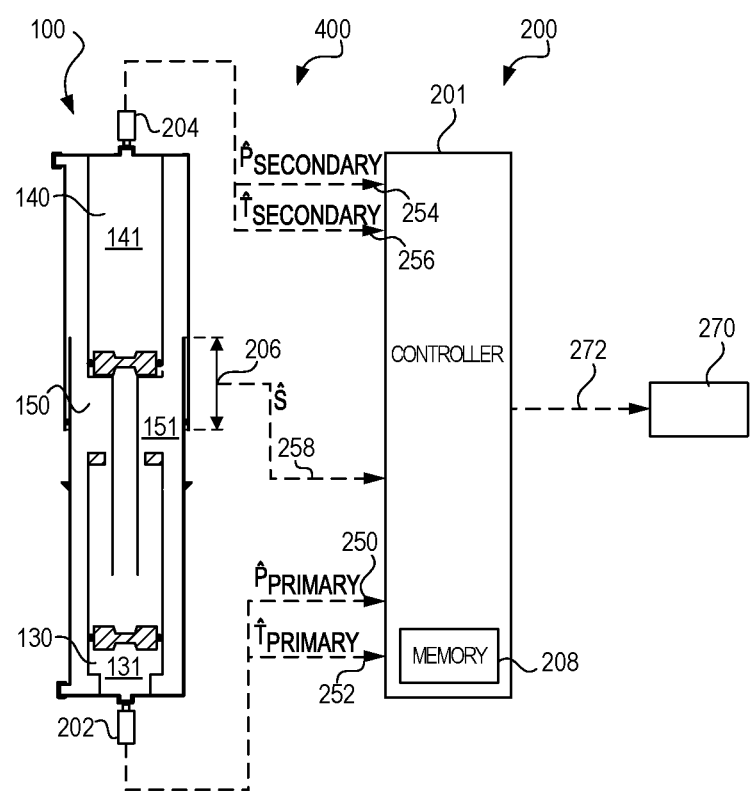
FIG. 4A illustrates a schematic view of a dual-stage, separated gas/fluid shock strut arrangement comprising the dual-stage, separated gas/fluid shock strut of FIG. 2 and a monitoring system, in accordance with various embodiments.
Figure 4B:
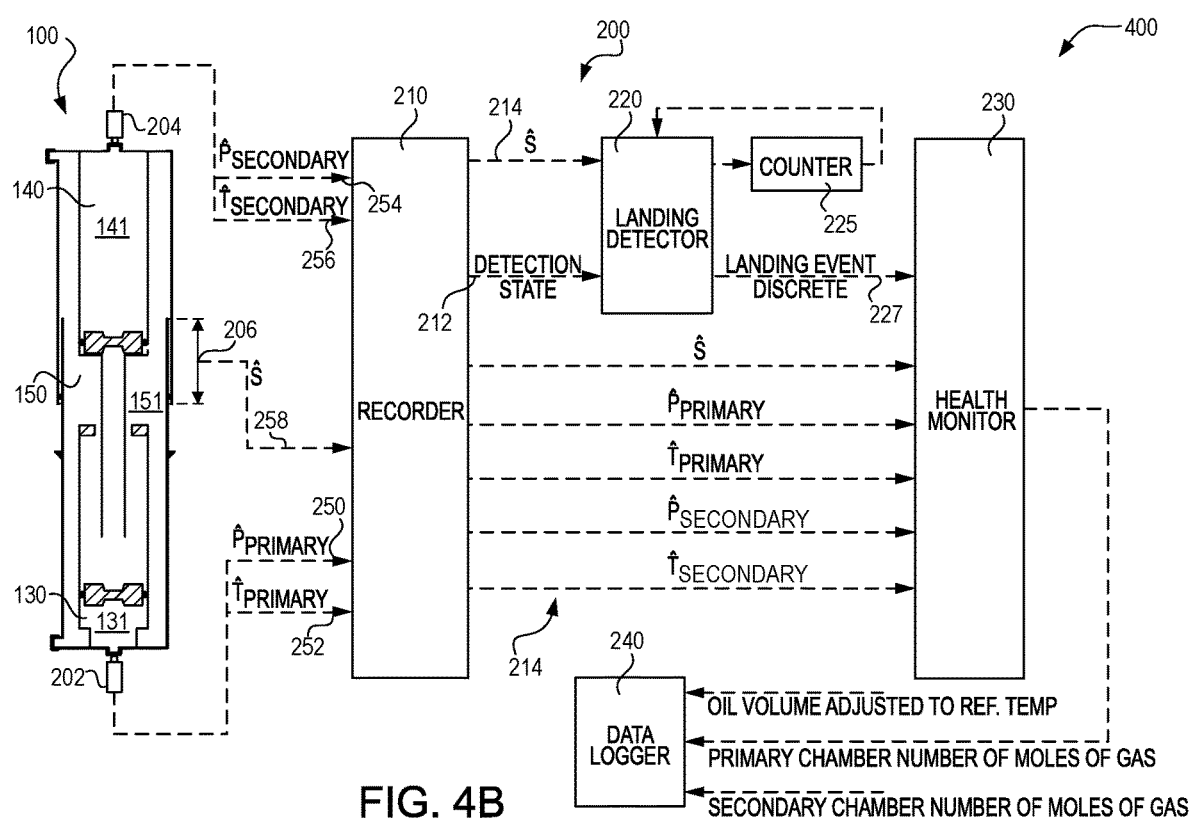
FIG. 4B illustrates a schematic view of the dual-stage, separated gas/fluid shock strut arrangement of FIG. 4A, with a more detailed view of the monitoring system, in accordance with various embodiments.

With reference to FIG. 4A and FIG. 4B, a dual-stage, separated gas/fluid shock strut arrangement (shock strut arrangement) 400 is illustrated, in accordance with various embodiments. Shock strut arrangement 400 may include shock strut 100 and a monitoring system 200. Monitoring system 200 may comprise various sensing elements. Monitoring system 200 may comprise an integrated pressure/temperature sensor (also referred to herein as a first pressure/temperature sensor) 202 installed on the primary gas chamber 130 to measure gas pressure and temperature within primary gas chamber 130. Although described herein as an integrated pressure/temperature sensor 202, it is contemplated herein that a separate pressure sensor and temperature sensor may be used in place of integrated pressure/temperature sensor 202. Monitoring system 200 may comprise an integrated pressure/temperature sensor (also referred to herein as a second pressure/temperature sensor) 204 installed on the secondary gas chamber 140 to measure gas pressure and temperature within secondary gas chamber 140. Although described herein as an integrated pressure/temperature sensor 204, it is contemplated herein that a separate pressure sensor and temperature sensor may be used in place of integrated pressure/temperature sensor 204. In this regard, the term "pressure/temperature sensor" as used herein, may refer to either an integrated pressure/temperature sensor or to separate pressure and temperature sensors. Monitoring system 200 may comprise a position sensor (also referred to herein as a stroke sensor) 206 configured to directly or indirectly measure the shock strut stroke 258 ($\hat{S}$). In this regard, the sensors may measure various parameters and provide measurements to monitoring system 200.

Integrated pressure/temperature sensor 202 may measure primary chamber gas pressure 250 ($\hat{P}_{primary}$), and primary chamber gas temperature 252 ($\hat{T}_{primary}$). Integrated pressure/temperature sensor 204 may measure secondary chamber gas pressure 254 ($\hat{P}_{secondary}$), and secondary chamber gas temperature 256 ($\hat{T}_{secondary}$). Stroke sensor 206 may measure shock strut stroke 258 ($\hat{S}$). Primary chamber gas pressure, $\hat{P}_{primary}$, primary chamber gas temperature, $\hat{T}_{primary}$, secondary chamber gas pressure, $\hat{P}_{secondary}$, secondary chamber gas temperature, $\hat{T}_{secondary}$, and shock strut stroke, $\hat{S}$ may be referred to herein as sensor readings (e.g., primary chamber gas pressure sensor reading). In various embodiments, $\hat{T}_{primary}$ and $\hat{T}_{secondary}$ may be used interchangeably.

Monitoring system 200 may be devised assuming that the sensors comprise a minimum sampling frequency of between 10 Hz and 1000 Hz in accordance with various embodiments, between 60 Hz and 200 Hz in accordance with various embodiments, or about 100 Hz in accordance with various embodiments, wherein the term "about" in this regard may mean ±20 Hz.

With reference to FIG. 4A, monitoring system 200 may comprise a controller 201 and a tangible, non-transitory memory 208 configured to communicate with the controller 201. The tangible, non-transitory memory 208 may have instructions stored thereon that, in response to execution by the controller 201, cause the controller 201 to perform various operations as described herein. Monitoring system 200 may comprise a visual display 270. Visual display 270 may be in electronic communication with controller 201. As described herein, controller 201 may issue or send a servicing message 272. Servicing message 272 may be displayed on visual display 270. In various embodiments, servicing message 272 may comprise an indication of a quantity of oil or gas in shock strut 100. In various embodiments, servicing message 272 may comprise a current and/or a voltage signal. Controller 201 may be in electronic communication with integrated pressure/temperature sensor 202 and integrated pressure/temperature sensor 204. FIG. 4B illustrates monitoring system 200 in further detail.

In various embodiments, with reference to FIG. 4B, monitoring system 200 may comprise a recorder 210, a landing detector 220, a counter 225, a health monitor 230, and/or a data logger 240. Recorder 210, landing detector 220, counter 225, health monitor 230, and/or data logger 240 may comprise instructions stored in a tangible, non-transitory memory 208 (see FIG. 4A). Recorder 210, landing detector 220, counter 225, health monitor 230, and/or data logger 240 may be implemented on one or more controllers (e.g., controller 201 of FIG. 4A). In this regard, controller 201 (see FIG. 4A) may comprise one or more controllers. For example, a first controller (e.g., recorder 210) may receive sensor information and a second controller (e.g., health monitor 230) may perform the calculations as described herein.

In various embodiments, recorder 210 may receive primary chamber gas pressure 250 ($\hat{P}_{primary}$), primary chamber gas temperature 252 ($\hat{T}_{primary}$), secondary chamber gas pressure 254 ($\hat{P}_{secondary}$), secondary chamber gas temperature 256 ($\hat{T}_{secondary}$), and shock strut stroke 258 ($\hat{S}$), and record them in an array that keeps the readings for a pre-determined length of time, such as 15 seconds for example. A new set of recordings may be added to the top of the array and the oldest set of data may be eliminated from the bottom of the array to keep the length of the array constant. At any instant, recorder 210 may export the array which comprises the latest set of data recorded over the pre-determined length of time to the landing detector 220. Recorder 210 may receive the sensor readings in real-time or at a later time.

At the startup when the length of the data array 214 is not equivalent to 15 seconds (tunable parameter), recorder 210 may send a false detection state signal 212 to landing detector 220 to prevent landing detector 220 from using the incomplete array. Once 15 seconds (tunable parameter) of measurement is available, the detection state signal 212 may turn true to allow landing detector 220 to use the measurements.

In various embodiments, landing detector 220 may receive the array of data 214 and check the array against the following set of criteria: first, that the minimum stroke in the array is smaller than a minimum dimension, such as 0.2" (tunable parameter), second, that the maximum stroke in the array is bigger than a maximum dimension, such as 5" (tunable parameter), third, that the stroke for the first five (5) seconds of the array is less than the minimum dimension, and fourth, that the maximum stroke in the first ten (10) seconds (tunable parameter) of the array is bigger than a threshold dimension, such as 4" (tunable parameter).

The first two criteria may ensure that the set of data is associated to a landing or a takeoff or any other event that has caused the shock strut to travel between 0.2" to 5" (tunable parameters). The third criterion may ensure that the set of data is associated to a landing as in the first five (5) seconds the shock strut has been fully extended. The fourth criterion may ensure that the selected set of data also includes 5 seconds of measurement after compression. It is contemplated herein that the algorithm parameters may be tuned according to various embodiments, for example may be tuned up further. If the data array 214 meets all these criteria, it is categorized as a landing event and exported to health monitor 230. A signal 227 may also be sent to the health monitor 230 indicating that the data array 214 meets all of the above criteria. A counter 225 may also be started to prevent landing detector 220 from receiving any new array of measurements for a predetermined duration, such as five (5) minutes (tunable parameter). This may relax the need for a high speed processor for health monitoring purposes. If the data array 214 does not meet all the criteria, landing detector 220 may disregard the array and wait for the new array of data.

In various embodiments, health monitor 230 may receive the array of data 214 that includes various sensor measurements. In various embodiments, the sensor measurements may include primary chamber gas pressure 250 ($\hat{P}_{primary}$) primary chamber gas temperature 252 ($\hat{T}_{primary}$), secondary chamber gas pressure 254 ($\hat{P}_{secondary}$), secondary chamber gas temperature 256 ($\hat{T}_{secondary}$), and/or shock strut stroke 258 ($\hat{S}$). The array of data 214 may be received by health monitor 230 for a pre-determined length of time, such as 15 seconds, for example.

Figure 4C:
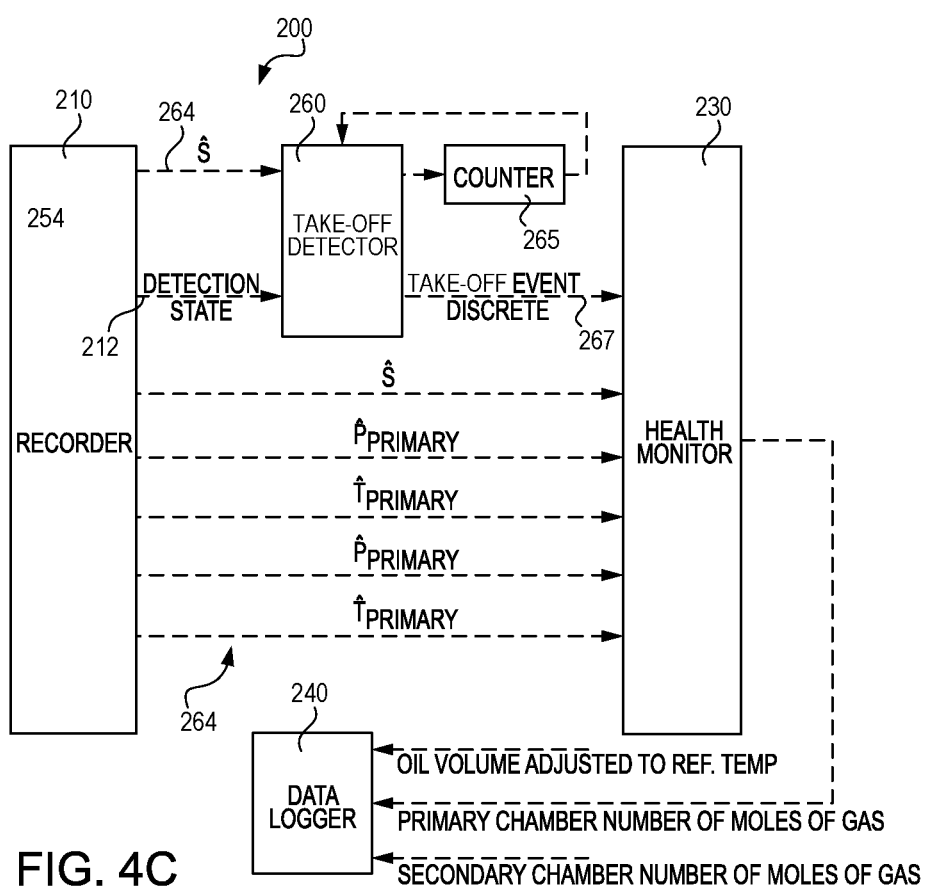
FIG. 4C illustrates a schematic view of a portion of the monitoring system of FIG. 4B with a take-off detector, in accordance with various embodiments.

With reference to FIG. 4C, a portion of monitoring system 200 is illustrated with a take-off detector 260. In this regard, in addition to landing detector 220, monitoring system 200 may further comprise take-off detector 260. It may be desirable to ensure that sensor readings are available when shock strut 100 is in the fully extended position, as illustrated in FIG. 1. Thus, take-off detector 260 may be provided to detect a take-off event. After take-off, shock strut 100 may be in a fully extended position. In this regard, sensor readings taken after take-off may comprise values corresponding to a shock strut stroke of zero (0). In this regard, monitoring system 200 may use sensor readings from data array 264 for calculations which use data corresponding to a shock strut stroke of zero (0), as described herein.

Take-off detector 260 may operate similar to landing detector 220, but using different criteria to examine stroke sensor readings to determine the take-off event. A data array 264 may be sent from recorder 210 to take-off detector 260. Similarly, data array 264 may be sent to health monitor 230. Data array 264 may be similar to data array 214 as described in FIG. 4B. In this regard, at the startup when the length of the data array 264 is not equivalent to a predetermined duration, such as 15 seconds for example, recorder 210 may send a false detection state signal 212 to take-off detector 260 to prevent take-off detector 260 from using the incomplete array. Once the predetermined duration of measurement is available, the detection state signal 212 may turn true to allow take-off detector 260 to use the measurements in the data array 264.

In various embodiments, take-off detector 260 may receive the array of data 264 and check the array against the following set of criteria: first, that the minimum stroke in the array is less than a minimum dimension (i.e., $S_{min,takeoff}$), such as 0.2" (tunable parameter), second, that the maximum stroke in the array is greater than a maximum dimension (i.e., $S_{max,takeoff}$), such as 5" (tunable parameter), third, that the stroke for the first five (5) seconds of the array is greater than the maximum dimension (i.e., $S_{max,takeoff}$), and fourth, that the minimum stroke in the first ten (10) seconds (tunable parameter) of the array is less than the minimum dimension (i.e., $S_{min,takeoff}$).

The first two criteria may ensure that the set of data is associated to a landing or a takeoff or any other event that has caused the shock strut to travel between 0.2" to 5" (tunable parameters). The third criterion may ensure that the set of data is associated to a takeoff because in the first five (5) seconds of data the shock strut is compressed to a shock strut stroke greater than $S_{max,takeoff}$. The fourth criterion may ensure that the selected set of data also includes 5 seconds of measurement after takeoff. It is contemplated herein that the algorithm parameters may be tuned according to various embodiments. If the data array 264 meets all these criteria, it is categorized as a take-off event and exported to health monitor 230. A signal 267 may also be sent to the health monitor 230 indicating that the data array 264 meets all of the above criteria. A counter 265 may also be started to prevent take-off detector 260 from receiving any new array of measurements for a predetermined duration, such as five (5) minutes (tunable parameter). This may relax the need for a high speed processor for health monitoring purposes. If the data array 264 does not meet all the criteria, take-off detector 260 may disregard the array and wait for the new array of data.

Figure 5:
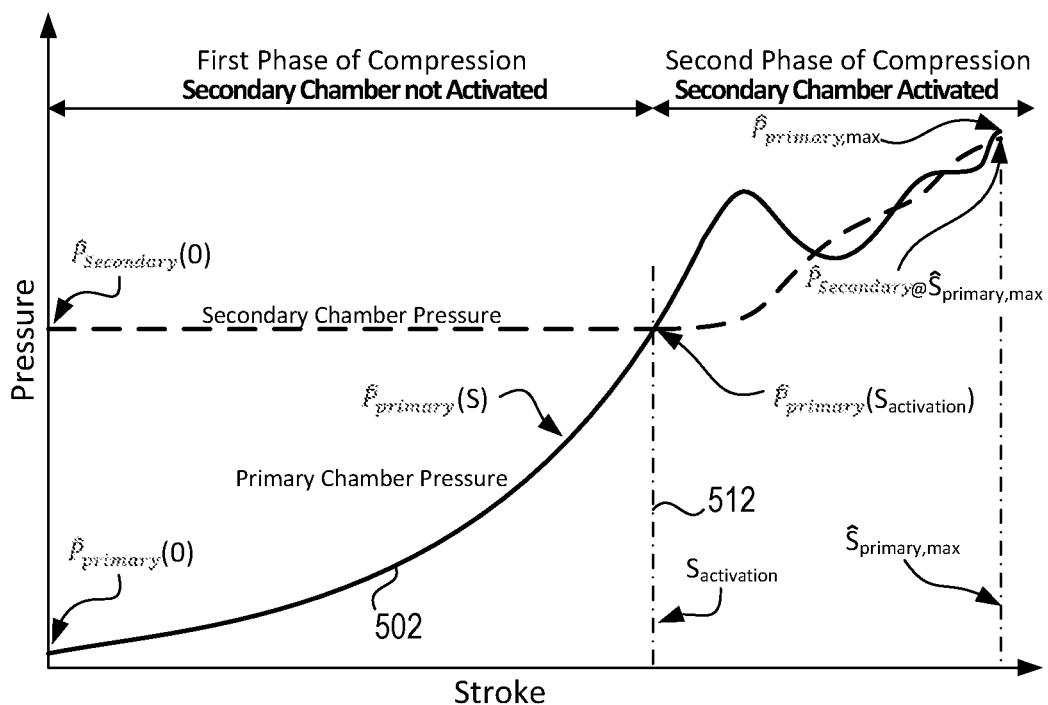
FIG. 5 illustrates a dynamic airspring curve of a primary gas chamber and a secondary gas chamber, in accordance with various embodiments.

Pressure Loss Check:

With combined reference to FIG. 4B and FIG. 5, the measured primary chamber gas pressure 250 at a shock strut stroke of zero (i.e., $\hat{P}_{primary}(0)$) and the measured secondary chamber gas pressure 254 at a shock strut stroke of zero (i.e., $\hat{P}_{secondary}(0)$) may be compared to determine that a major pressure loss has not occurred in the secondary gas chamber 140. In this regard, monitoring system 200 may determine that the following equation holds:

$$\hat{P}_{secondary}(0) \geq \hat{P}_{primary}(0) + \sigma \qquad \text{Eq. (1)}$$

where σ is a predetermined value, such as 100 psi (689.476 kPa) for example. σ may be selected to ensure that the difference between the secondary chamber pressure and the primary chamber pressure is above the sensor measurement error range. If Eq. 1 is false, the monitoring system 200 may generate a message indicating that there has been a major loss of pressure in the secondary gas chamber 140 and that the algorithm cannot be executed. If Eq. 1 is true, then monitoring system 200 may perform the following operations, as described herein.

Oil Volume Determination:

In various embodiments, the oil volume 151 may be determined via health monitor 230.

With combined reference to FIG. 4B and FIG. 5, at the onset of compression of the shock strut 100, the pressure within primary gas chamber 130 is less than the pressure within secondary gas chamber 140. As compression continues, the primary chamber gas pressure increases and may exceed the secondary chamber gas pressure. Once the primary chamber gas pressure exceeds the secondary chamber gas pressure, the secondary gas chamber 140 may be activated and further compression of shock strut 100 may cause compression of both primary gas chamber 130 and secondary gas chamber 140. Monitoring system 200 may utilize the measured dynamic airspring curve 502 of the primary gas chamber 130, before secondary chamber activation, to determine volume of oil 151 in oil chamber 150. In the first stage of compression, the shock strut functions as a single-stage, separated gas/fluid shock strut with a known initial internal volume.

In this regard, monitoring system 200 may use dynamic airspring curve 502 of primary gas chamber 130 and the secondary chamber inflation pressure (i.e., $\hat{P}_{secondary}(0)$) measured at a shock strut stroke of zero (or a shock strut stroke near zero such as a shock strut of 25% of the maximum shock strut stroke or less) to determine the shock strut stroke at which the secondary chamber is activated (i.e., $S_{activation}$). With focus on FIG. 5, it is noted that the activation stroke 512 of the secondary chamber (i.e., $S_{activation}$) is the maximum shock strut stroke at which the primary chamber pressure is less than or equal to the secondary chamber inflation pressure. That is, $$S_{activation} = \{\max S | \hat{P}_{primary}(S) \leq \hat{P}_{secondary}(0)\} \qquad \text{Eq. (2)}$$

Once the activation stroke 512 of the secondary chamber is determined, the primary chamber inflation pressure in the fully extended position (i.e., $\hat{P}_{primary}(0)$), the primary chamber temperature in the fully extended position (i.e., $\hat{T}_{primary}(0)$), the activation stroke 512 of the secondary chamber (i.e., $S_{activation}$), and the primary chamber pressure at $S_{activation}$ (i.e., $\hat{P}_{primary}(S_{activation})$) may be stored for use by monitoring system 200 to determine the volume of oil 151.

Figure 6:
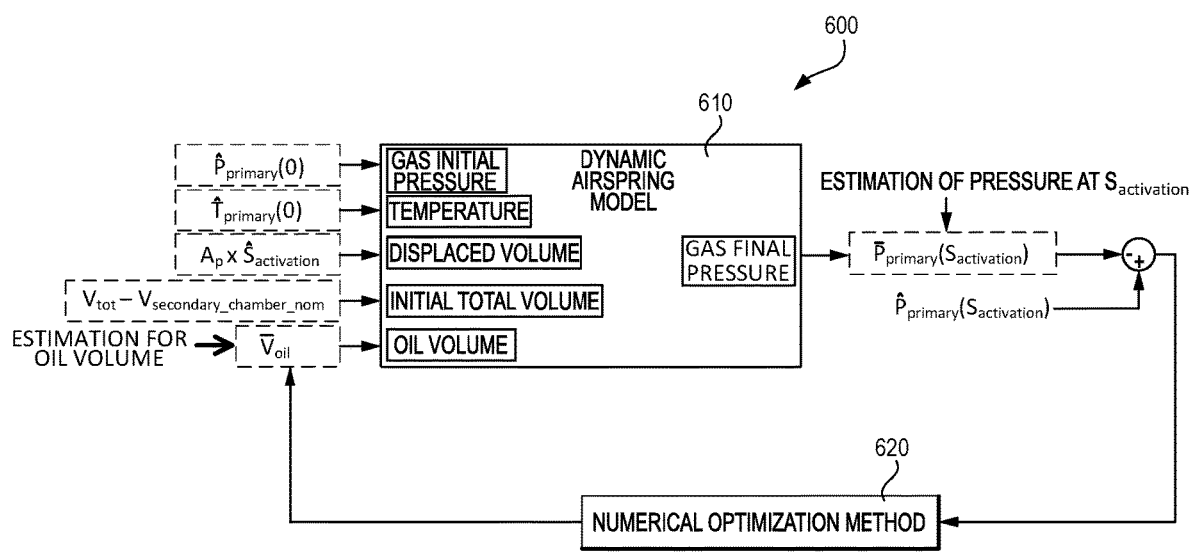
FIG. 6 illustrates an algorithm for estimating a volume of oil in an oil chamber of the shock strut, in accordance with various embodiments.

With combined reference to FIG. 4B and FIG. 6, monitoring system 200 may use a dynamic airspring model 610, along with a numerical optimization method 620 to estimate the volume of the oil 151 in oil chamber 150. In this regard, FIG. 6 illustrates an algorithm 600 for estimating the oil volume 151 in oil chamber 150. Dynamic airspring model 610 may generate an accurate estimation of transient gas pressure for a single-stage, separated gas/fluid shock strut for a displacement volume, if oil volume, initial temperature, initial gas pressure, and initial total internal volume are known. However, since the oil volume is required for the model to work, the algorithm 600 provides an initial estimate for the volume of oil (i.e., $\hat{V}_{oil}$), computes the pressure at $S_{activation}$, and then compares said pressure with the measured pressure at $S_{activation}$. Stated differently, health monitor 230 may use the primary chamber inflation pressure in the fully extended position (i.e., $\hat{P}_{primary}(0)$), the primary chamber temperature in the fully extended position (i.e., $\hat{T}_{primary}(0)$), the displacement volume of the primary gas chamber 130 at $S_{activation}$ (i.e., $S_{activation} * A_p$), the total volume of the primary gas chamber 130 and the oil chamber 150 (i.e., $V_{tot} - V_{secondary\_chamber\_nom}$), and an initial estimate for the volume of the oil in oil chamber 150 (i.e., $\hat{V}_{oil}$), for example 10 cubic inches (163.87 cm³), and may compute the primary chamber gas pressure at $S_{activation}$.

A gradient free, single-variable, numerical optimization technique, such as Bisection or Line Search methods may be used to adjust the initial estimate for the oil volume so that the difference between the measured primary gas chamber pressure at $S_{activation}$ (i.e., $\hat{P}_{primary}(S_{activation})$), (see FIG. 5) and the estimated primary gas chamber pressure at $S_{activation}$ (i.e., $\overline{P}_{primary}(S_{activation})$) is minimized. In various embodiments, the nominal value of the oil volume may be used as the initial estimate for the oil volume, which may improve the optimization convergence speed. A block diagram of the algorithm 600, described above, for shock strut oil volume determination is provided in FIG. 6.

The optimization loop may continue until the absolute difference between the estimated pressure and the measured pressure at $S_{activation}$ is less than or equal to a pre-determined threshold as follows:

$$|\hat{P}_{primary}(S_{activation}) - \overline{P}_{primary}(S_{activation})| \leq \text{Threshold 1} \qquad \text{Eq. (3)}$$

When equation 3 is satisfied, the last estimate for the oil volume (i.e., $\hat{V}_{oil}$) may be recorded as the oil volume 151 inside the oil chamber 150 at the shock strut stroke of zero. That is:

$$V_{oil}(0) = \overline{V}_{oil} \qquad \text{Eq. (4)}$$

Primary Chamber Gas Level Determination:

Once the oil volume in the fully extended position is determined, the primary chamber gas volume in the fully extended position may be determined as follows:

$$V_{primary\_chamber}(0) = V_{tot} - V_{secondary\_chamber\_nom} - V_{oil}(0) \qquad \text{Eq. (5)}$$

where $V_{tot}$ is the total internal volume of the shock strut in the fully extended position and $V_{secondary\_chamber\_nom}$ is the nominal volume of the secondary chamber when shock strut 100 is in the fully extended position (see FIG. 1).

The number of moles of gas in the primary gas chamber 130 of the shock strut 100 may then be computed using the following equation:

$$n_{primary\_chamber} = \frac{\hat{P}_{primary}(0) \times V_{primary\_chamber}(0)}{R \times \hat{T}_{primary}(0) \times Z(\hat{P}_{primary}(0), \hat{T}_{primary}(0))} \qquad \text{Eq. (6)}$$

where R is the ideal gas constant and Z ($\hat{P}_{primary}(0)$, $\hat{T}_{primary}(0)$) is the nitrogen compressibility factor. The computed number of moles of gas in the primary gas chamber 130 may be then logged in the data logger 240. Although $\hat{P}_{primary}(0)$ and $\hat{T}_{primary}(0)$ are described herein as being measured during a landing event, it is contemplated herein that they may also be recorded after a takeoff event. In various embodiments, $\hat{P}_{primary}(0)$ and $\hat{T}_{secondary}(0)$ at any point during a take-off event (e.g., detected by takeoff detector 260 with momentary reference to FIG. 4C) or a landing event may be used. In this regard, $\hat{P}_{primary}(0)$ and $\hat{T}_{primary}(0)$ are primary chamber gas pressure and temperature, respectively, when the shock strut 100 is in the fully extended position (or within 25% of the fully extended position) recorded either during a landing event or a takeoff event. It is noteworthy that instead of primary chamber temperature, $\hat{T}_{primary}(0)$, the secondary chamber temperature, $\hat{T}_{secondary}(0)$, may be used to calculate the number of moles of gas in the primary gas chamber 130.

Primary Chamber Oil Leakage Volume Determination:

Depending on the aircraft's sink-rate, dynamic weight on the landing gear and the shock strut internal fluid levels the primary chamber may or may not reach a maximum compression stroke (e.g., separator piston 132 may "bottom out") during a landing event. If the primary chamber does not reach a maximum compression stroke during the landing even, the maximum pressure achieved in the primary chamber will be equal to the maximum pressure in the secondary chamber at the maximum compression stroke. If the primary chamber reaches the maximum compression stroke, the secondary chamber pressure continues to increase while the primary chamber pressure drops due to thermal losses. Under both conditions, a maximum pressure value for the primary chamber can be found. Moreover, under both conditions, the secondary chamber pressure will be nearly equal to the primary chamber pressure when the primary chamber pressure reaches its maximum value.

In various embodiments, with combined reference to FIG. 4B and FIG. 5, monitoring system 200 may determine the maximum pressure (also referred to herein as the maximum primary chamber pressure) of primary gas chamber 130 during landing (i.e., $\hat{P}_{primary,max}$) and the shock strut stroke associated with said pressure (i.e., $\hat{S}_{primary,max}$). Once $\hat{P}_{primary,max}$ and $\hat{S}_{primary,max}$ are determined, the total volume of the primary and secondary chambers at $\hat{S}_{primary,max}$ may be determined, as follows:

$$V_{oil}(\hat{S}_{primary,max}) = V_{oil}(0) \times \left(1 - \frac{\hat{P}_{primary,max} - \hat{P}_{primary}(0)}{\beta}\right) \quad \text{Eq. 7}$$

and $$V_{primary+secondary}(\hat{S}_{primary,max}) = V_{tot} - A_p \times \hat{S}_{primary,max} - V_{oil}(\hat{S}_{primary,max}) \quad \text{Eq. 8}$$

where β is the oil bulk modulus, $V_{tot}$ is the total internal volume of the shock strut in the fully extended position, and $A_p$ is the piston area. $V_{primary+secondary}(\hat{S}_{primary,max})$ is the total volume of the primary and secondary gas chambers at the stroke at which the primary chamber pressure reaches its maximum level during landing.

Figure 7:
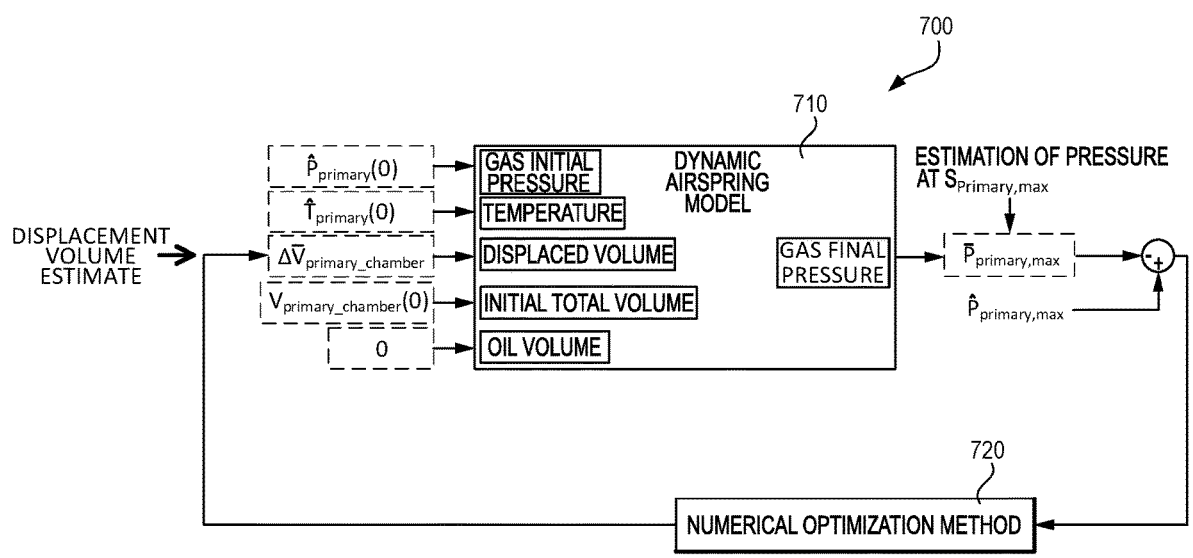
FIG. 7 illustrates an algorithm for estimating a displacement volume of a primary gas chamber, in accordance with various embodiments.

With combined reference to FIG. 4B and FIG. 7, monitoring system 200 may use a dynamic airspring model 710, along with a numerical optimization method 720 to estimate the displacement volume of the primary chamber at $\hat{S}_{primary,max}$. In this regard, FIG. 7 illustrates an algorithm 700 for estimating the displacement volume of the primary chamber at $\hat{S}_{primary,max}$. Dynamic airspring model 710 may generate an accurate estimation of transient gas pressure for a single-stage, separated gas/fluid shock strut for a displacement volume, if oil volume, initial temperature, initial gas pressure, and initial total internal volume are known. However, since the displacement volume is required for the model to work, the algorithm 700 provides an initial estimate for the displacement volume (i.e., $\Delta V_{primary\_chamber}$), computes the pressure at $\hat{S}_{primary,max}$, and then compares said pressure with the measured pressure at $\hat{S}_{primary,max}$. Stated differently, health monitor 230 may use the measured primary chamber inflation pressure in the fully extended position (i.e., $\hat{P}_{primary}(0)$), the primary chamber temperature in the fully extended position (i.e., $\hat{T}_{primary}(0)$), the initial estimate for the displacement volume of the primary gas chamber 130 (i.e., $\Delta V_{primary\_chamber}$), the total volume of the primary gas chamber 130, calculated by Eq. 5 (i.e., $V_{primary\_chamber}(0)$), and an oil volume of zero, and may compute the primary chamber gas pressure at $\hat{S}_{primary,max}$.

A gradient free, single-variable, numerical optimization technique, such as Bisection or Line Search methods may be used to adjust the initial estimate for displacement volume so that the difference between the measured primary gas chamber pressure at $\hat{S}_{primary,max}$ (i.e., $\hat{P}_{primary,max}$, (see FIG. 5) and the estimated primary gas chamber pressure at $\hat{S}_{primary,max}$ (i.e., $\overline{P}_{primary,max}$ is minimized.

The optimization loop may continue until the absolute difference between the estimated pressure and the measured pressure at $S_{primary,max}$ is less than or equal to a predetermined threshold as follows:

$$|\hat{P}_{primary,max} - \overline{P}_{primary,max}| \leq \text{Threshold 2} \quad \text{Eq. (9)}$$

When equation 9 is satisfied, the last estimate for the displacement volume of the primary gas chamber (i.e., $\Delta V_{primary\_chamber}$) may be recorded and the gas volume in the primary gas chamber 130 at $\hat{S}_{primary,max}$ may be determined as follows:

$$V_{primary\_chamber}(\hat{S}_{primary,max}) = V_{primary\_chamber}(0) - \Delta \overline{V}_{primary\_chamber} \quad \text{Eq. (10)}$$

If $V_{primary\_chamber}(\hat{S}_{primary,max})$ is larger than the primary chamber dead volume (i.e., $V_{primary\_chamber\_dead}$), no conclusion may be made regarding the possible oil leakage into the primary chamber. If $V_{primary\_chamber}(\hat{S}_{primary,max})$ is smaller or equal to the primary chamber dead volume, then the volume of oil leakage into the primary chamber (also referred to herein as a primary chamber oil leakage volume) is estimated as follows:

If $V_{primary\_chamber}(\hat{S}_{primary,max})$
$\leq V_{primary\_chamber\_dead} \rightarrow V_{primary\_chamber\_leakage} = V_{primary\_chamber\_dead} - V_{primary\_chamber}(\hat{S}_{primary,max})$ Eq. (11)

Secondary Chamber Gas Level and Oil Leakage Volume Determination:

In various embodiments, with reference to FIG. 4B, the secondary gas chamber 140 gas level may be determined. In this step, monitoring system 200 may compute the volume of the secondary gas chamber 140 at the stroke of $\hat{S}_{primary,max}$ as follow:

$$V_{secondary\_chamber}(\hat{S}_{primary,max}) = V_{primary+secondary}(\hat{S}_{primary,max}) - V_{primary\_chamber}(\hat{S}_{primary,max}) \quad \text{Eq. (12)}$$

and the displacement volume of the secondary gas chamber 140 at $\hat{S}_{primary,max}$ may be determined as follows:

$$\Delta V_{secondary\_chamber} = V_{secondary\_chamber\_nom} - V_{secondary\_chamber}(\hat{S}_{primary,max}) \quad \text{Eq. (13)}$$

Figure 8:
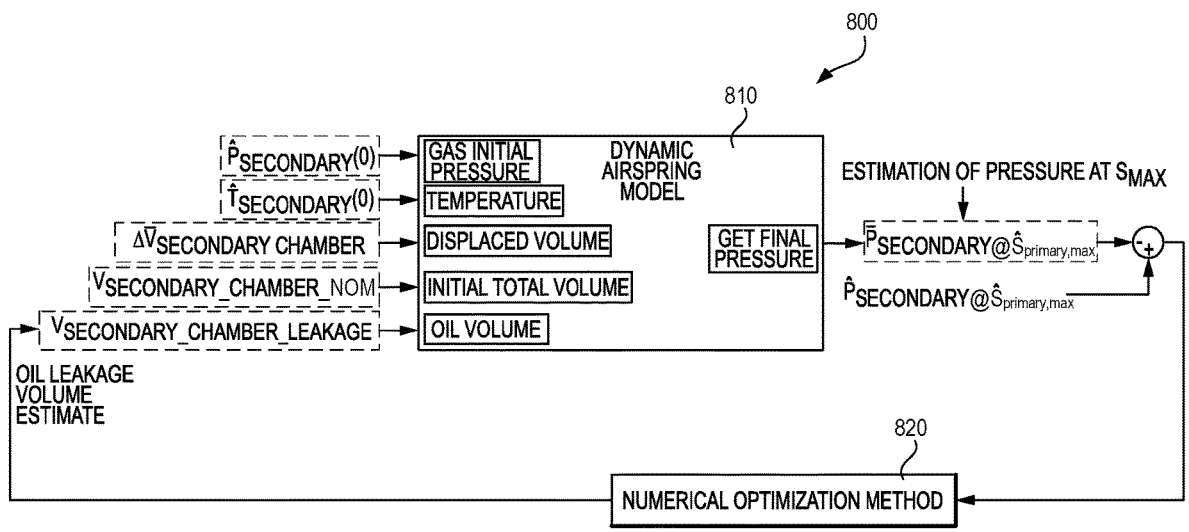
FIG. 8 illustrates an algorithm for estimating a volume of oil leaked into a secondary gas chamber, in accordance with various embodiments.

With combined reference to FIG. 4B and FIG. 8, health monitor 230 may use a dynamic airspring model 810, along with a numerical optimization method 820 to estimate the volume of the oil in the secondary gas chamber 140. In this regard, FIG. 8 illustrates an algorithm 800 for estimating the volume of oil leaked into secondary gas chamber 140 (also referred to herein as a secondary chamber oil leakage volume). Dynamic airspring model 810 may generate an accurate estimation of transient gas pressure for compression of a separated gas chamber in which mixing of air and oil does not happen.

Health monitoring 230 may use the secondary gas chamber inflation pressure (i.e., $\hat{P}_{Secondary}(0)$), the secondary gas chamber temperature (i.e., $\hat{T}_{Secondary}(0)$), the displacement volume of the secondary gas chamber 140 at $\hat{S}_{primary,max}$, computed by equation 13, the nominal volume of the secondary gas chamber with its piston bottomed out (i.e., $V_{secondary\_chamber\_nom}$) and an initial estimate for the volume of the oil leakage into the secondary gas chamber 140 (i.e., $V_{secondary\_chamber\_leakage}$), for example 0 cubic inches, and may compute the secondary chamber pressure at $\hat{S}_{primary,max}$.

A gradient free, single-variable, numerical optimization technique, such as Bisection or Line Search methods may be used to adjust the initial estimate for the oil leakage so that the difference between the measured secondary gas chamber pressure at $\hat{S}_{primary,max}$ (i.e., $\hat{P}_{secondary}(\hat{S}_{primary,max})$) (see FIG. 5) and the estimated secondary gas chamber pressure at $\hat{S}_{primary,max}$ (i.e. $\overline{P}_{Secondary@\hat{S}_{primary,max}}$) is minimized.

The optimization loop may continue until the absolute difference between the estimated pressure and the measured pressure at $\hat{S}_{primary,max}$ is less than or equal to a predetermined threshold as follows:

$$\frac{|\hat{P}_{Secondary@\hat{S}_{primary,max}} - \overline{P}_{Secondary@\hat{S}_{primary,max}}|}{\overline{P}_{Secondary@\hat{S}_{primary,max}}} \le \text{Threshold 3} \quad \text{Eq. (14)}$$

When equation 14 is satisfied, the last estimate for the oil leakage (i.e., $V_{secondary\_chamber\_leakage}$) may be recorded. In various embodiments, if $V_{secondary\_chamber\_leakage} < 0$, which may possibly be caused by measurement errors, then oil leakage into the secondary gas chamber will be considered zero.

With the volume of oil leakage into the secondary gas chamber 140 being determined, the gas volume in the secondary gas chamber 140 in the fully extended position may be determined as follows:

$$V_{secondary\_chamber}(0) = V_{secondary\_chamber\_nom} - V_{secondary\_chamber\_leakage} \quad \text{Eq. (15)}$$

The number of moles of gas in the secondary gas chamber 140 of the shock strut 100 may then be computed using the following equation:

$$n_{secondary\_chamber} = \frac{\hat{P}_{secondary}(0) \times V_{primary\_chamber}(0)}{R \times \hat{T}_{secondary}(0) \times Z(\hat{P}_{secondary}(0), \hat{T}_{secondary}(0))} \quad \text{Eq. (16)}$$

where R is the ideal gas constant and $Z(\hat{P}_{secondary}(0), \hat{T}_{secondary}(0))$ is the nitrogen compressibility factor (or the compressibility factor for the type of gas used in shock strut 100). The computed number of moles of gas in the secondary gas chamber 140 may be then logged in the data logger 240. Although $\hat{P}_{secondary}(0)$ and $\hat{T}_{secondary}(0)$ are described herein as being measured during a landing event, it is contemplated herein that they may also be recorded after a takeoff event. In this regard, $\hat{P}_{secondary}(0)$ and $\hat{T}_{secondary}(0)$ are secondary chamber gas pressure and temperature, respectively, when the shock strut 100 is in the fully extended position (or within 25% of the fully extended position) recorded either during a landing event or a takeoff event. It is noteworthy that instead of secondary chamber temperature, $\hat{T}_{secondary}(0)$, the primary chamber temperature, $\hat{T}_{primary}(0)$, may be used to calculate the number of moles of gas in the secondary gas chamber 140.

Shock Strut Servicing State Determination:

In the next step, the oil volume estimated by Eq. 4 may be adjusted to a reference temperature, such as 20° C. (68° F.) using the following thermal model:

$$V_{oil@T_{ref}} = V_{oil} \times (1 + dT \times \alpha \times \text{sign}(T_{ref} - T_{oil}))^{\frac{|T_{ref} - T_{oil}|}{dT}} \quad \text{Eq. (17)}$$

where $\alpha$ is the oil thermal expansion coefficient, dT is a numerical integration step, and $T_{oil}$ is the oil temperature. $T_{oil}$ may be derived from $\hat{T}_{primary}$ or $\hat{T}_{secondary}$. The oil volume computed above may be then logged in the data logger 240.

The deviation of the oil volume 151 from the nominal oil volume may be computed as follows:

$$\% \text{ oil} = \frac{V_{oil@T_{ref}} - V_{oil\_nom}}{V_{oil\_nom}} \quad \text{Eq. (18)}$$

where $V_{oil\_nom}$ is the nominal oil volume which is known to the algorithm. In various embodiments, the nominal oil volume may be a desired volume of the oil volume 151 of shock strut 100. The deviation of the oil volume 151 from the nominal oil volume may be logged in data logger 240.

In the next step, the estimated oil volume at the reference temperature (output of Eq. 17) may be compared with a plurality of thresholds, such as four thresholds as used in the example herein, to determine if the estimated oil volume is acceptable and a proper servicing message may be issued as follows:

if $V_{oil@T_{ref}} > V_{threshold,1}$ → oil is extremely overserviced, re-servicing is required if $V_{threshold,1} \ge V_{oil@T_{ref}} > V_{threshold,2}$ → oil is overserviced, re-servicing is recommanded if $V_{threshold,2} \ge V_{oil@T_{ref}} > V_{threshold,3}$ → oil volume is ok—no action is required if $V_{threshold,3} \ge V_{oil@T_{ref}} > V_{threshold,4}$ → oil is underserviced—prepare for servicing if $V_{threshold,4} \ge V_{oil@T_{ref}}$ → oil is extremly underserviced—servicing is required.

The issued servicing message may be logged in the data logger 240.

In the next step, the number of moles of gas in the primary gas chamber 130 estimated by Eq. (6) may be compared with the nominal number of moles of gas calculated with the following equation:

$$n_{primary\_chamber\_nominal} = \frac{P_{primary\_nom} \times V_{primary\_chamber\_nom}}{R \times T_{ref} \times Z(P_{primary\_nom}, T_{ref})} \quad \text{Eq. (19)}$$

The deviation of the primary chamber gas level from the nominal value may be computed as follows:

$$\% \, primary_{gas} = \frac{n_{primary\_chamber} - n_{primary\_chamber\_nominal}}{n_{primary\_chamber\_nominal}} \quad \text{Eq. (20)}$$

The deviation of the primary gas level from the nominal level may be logged in data logger 240.

The estimated number of moles of gas in the primary gas chamber 130 may be compared with a plurality of thresholds, such as four thresholds as used in the example herein, and a proper servicing message is issued as follows:

if $n_{primary\_chamber} > n_{primary,threshold,1} \rightarrow$ primary chamber is extremely overserviced, re-servicing is required if $n_{primary,threshold,1} \geq n_{primary\_chamber} > n_{primary,threshold,2} \rightarrow$ primary chamber is overserviced, re-servicing is recommended if $n_{primary,threshold,2} \geq n_{primary\_chamber} > n_{primary,threshold,3} \rightarrow$ primary chamber gas level is ok—no action is required if $n_{primary,threshold,3} \geq n_{primary\_chamber} > n_{primary,threshold,4} \rightarrow$ primary chamber is underserviced—prepare for servicing if $n_{primary,threshold,4} \geq n_{primary\text{-}chamber} \rightarrow$ primary chamber is extremely underserviced—servicing is required.

The issued servicing message may be logged in data logger 240.

In the next step, the number of moles of gas in the secondary gas chamber 140 estimated by Eq. (14) may be compared with the nominal number of moles of gas calculated with the following equation:

$$n_{secondary\_chamber\_nominal} = \frac{P_{primary\_nom} \times V_{primary\_chamber\_nom}}{R \times T_{ref} \times Z(P_{secondary\_nom}, T_{ref})} \quad \text{Eq. (21)}$$

The deviation of the secondary chamber gas level from the nominal value may be computed as follows:

$$\% \, secondary\_gas = \frac{n_{secondary\_chamber} - n_{secondary\_chamber\_nominal}}{n_{secondary\_chamber\_nominal}} \quad \text{Eq. (22)}$$

The deviation of the secondary gas level from the nominal level may be logged in data logger 240.

The estimated number of moles of gas in the secondary gas chamber 140 may be compared with four thresholds (or any other number of thresholds) and a proper servicing message may be issued as follows:

if $n_{secondary\_chamber} > n_{secondary,threshold,1} \rightarrow$ secondary chamber is extremely overserviced, re-servicing is required if $n_{secondary,threshold,1} \geq n_{secondary\_chamber} > n_{secondary,threshold,2} \rightarrow$ secondarychamber is overserviced, re-servicing is recommended if $n_{secondary,threshold,2} \geq n_{secondary\_chamber} > n_{secondary,threshold,3} \rightarrow$ secondarychamber gas level is ok—no action is required if $n_{secondary,threshold,3} \geq n_{secondary\_chamber} > n_{secondary,threshold,4} \rightarrow$ secondarychamber is underserviced—prepare for servicing if $n_{secondary,threshold,4} \geq n_{secondary\_chamber} \rightarrow$ secondarychamber is extremely underserviced—servicing is required.

The issued servicing message may be logged in data logger 240.

The volume of oil leakage into the primary gas chamber 130 (calculated by Eq. 11) may be compared with a plurality of thresholds and a proper servicing message may be issued as follows:

if $V_{primary\_chamber\_leakage\_threshold\_1} > V_{primary\_chamber\_leakage} \rightarrow$ no leakage, no action is required if $V_{primary\_chamber\_leakage\_threshold\_2} > V_{primary\_chamber\_leakage} \geq V_{primary\_chamber\_leakage\_threshold\_1} \rightarrow$ some leakage into the primary chamber, prepare for inspection if $V_{primary\_chamber\_leakage} \geq V_{primary\_chamber\_leakage\_threshold\_2} \rightarrow$ excessive leakage into the primary chamber, inspection is required The issued servicing message may be logged in data logger 240.

The volume of oil leakage into the secondary gas chamber 140 recorded by monitoring system 200 may be compared with a plurality of thresholds and a proper servicing message may be issued as follows:

if $V_{secondary\_chamber\_leakage\_threshold\_1} > V_{secondary\_chamber\_leakage} \rightarrow$ no leakage, no action is required if $V_{secondary\_chamber\_leakage\_threshold\_2} > V_{secondary\_chamber\_leakage} \geq V_{secondary\_chamber\_leakage\_threshold\_1} \rightarrow$ some leakage into the secondary chamber, prepare for inspection if $V_{secondary\_chamber\_leakage} \geq V_{secondary\_chamber\_leakage\_threshold\_2} \rightarrow$ excessive leakage into the secondary chamber, inspection is required The issued servicing message may be logged in data logger 240.

Figure 9:
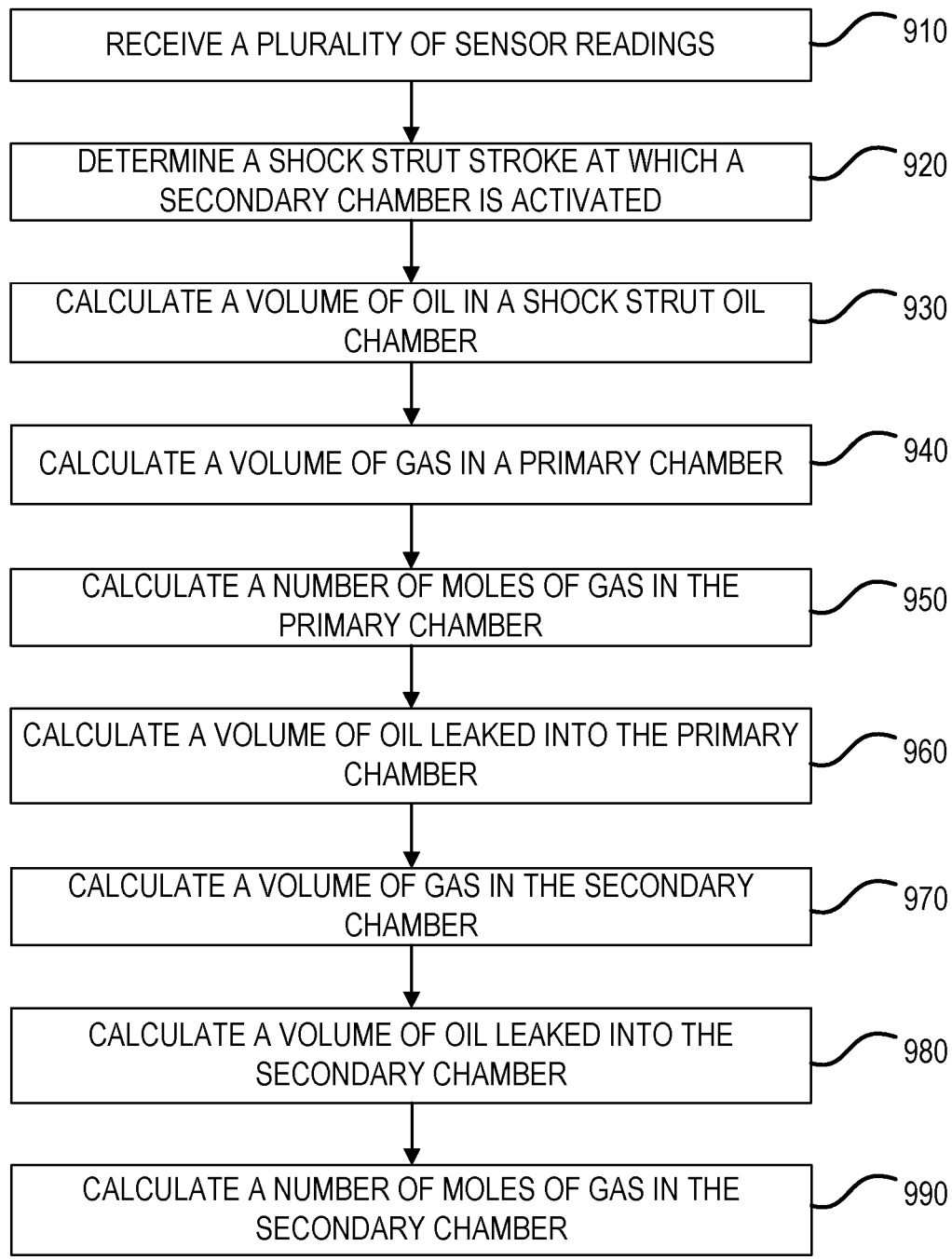
FIG. 9 illustrates a method for monitoring a dual-stage, separated gas/fluid shock strut, in accordance with various embodiments.

With reference to FIG. 9, a method 900 for monitoring a shock strut is provided, in accordance with various embodiments. Method 900 includes receiving a plurality of sensor readings (step 910). Method 900 includes determining a shock strut stroke at which a secondary chamber is activated (step 920). Method 900 includes calculating a volume of oil in an oil chamber (step 930). Method 900 includes calculating a volume of gas in a primary chamber (step 940). Method 900 includes calculating a number of moles of gas in the primary chamber (step 950). Method 900 includes calculating a volume of oil leaked into the primary chamber (step 960). Method 900 includes calculating a volume of gas in a secondary chamber (step 970). Method 900 includes calculating a volume of oil leaked into the secondary chamber (step 980). Method 900 includes calculating a number of moles of gas in the secondary chamber (step 990).

With combined reference to FIG. 4A, FIG. 4B, and FIG. 9, step 910 may include receiving, by controller 201, primary chamber gas pressure 250, primary chamber gas temperature 252, secondary chamber gas pressure 254, secondary chamber gas temperature 256, and/or shock strut stroke 258. Step 920 may include determining, by controller 201, $S_{activation}$. $S_{activation}$ may be determined using equation 2, as described herein. Step 930 may include determining, by controller 201, oil volume 151 using algorithm 600 (see FIG. 6), as described herein. Step 940 may include calculating, by controller 201, volume of gas 131 in primary gas chamber 130, as described herein. Step 950 may include calculating, by controller 201, a number of moles of gas in the primary gas chamber 130 using Eq. 6, as described herein. Step 960 may include calculating, by controller 201, a volume of oil leaked into the primary gas chamber 130 (i.e., $V_{primary\_chamber\_leakage}$) using equation 11, as described herein. Step 970 may include calculating, by controller 201, a volume of gas 141 in secondary gas chamber 140 using equation 12, as described herein. Step 980 may include calculating, by controller 201, a volume of oil leaked into the secondary chamber (i.e., $V_{secondary\_chamber\_leakage}$) using algorithm 800, as described herein. Step 990 may include calculating, by controller 201, a number of moles of gas in the secondary gas chamber 140, using equation 21, as described herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring a dual-stage, separated gas/fluid shock strut, comprising:
   receiving, by a controller, a primary chamber temperature sensor reading;
   receiving, by the controller, a primary chamber pressure sensor reading;
   receiving, by the controller, a secondary chamber pressure sensor reading;
   receiving, by the controller, a secondary chamber temperature sensor reading;
   receiving, by the controller, a shock strut stroke sensor reading;
   activating a secondary gas chamber of the dual-stage, separated gas/fluid shock strut by compressing the dual-stage, separated gas/fluid shock strut and thereby increasing a primary chamber pressure to be equal to or greater than a secondary chamber pressure;
   determining, by the controller, a shock strut stroke at which the secondary gas chamber is activated;
   calculating, by the controller, a volume of oil in an oil chamber of the dual-stage, separated gas/fluid shock strut;
   calculating, by the controller, a primary chamber gas volume in a primary gas chamber of the dual-stage, separated gas/fluid shock strut;
   calculating, by the controller, a number of moles of gas in the primary gas chamber of the dual-stage, separated gas/fluid shock strut;
   calculating, by the controller, a volume of oil leaked into the primary gas chamber of the dual-stage, separated gas/fluid shock strut;
   calculating, by the controller, a secondary chamber gas volume in the secondary gas chamber of the dual-stage, separated gas/fluid shock strut;
   calculating, by the controller, a volume of oil leaked into the secondary gas chamber of the dual-stage, separated gas/fluid shock strut; and
   calculating, by the controller, a number of moles of gas in the secondary gas chamber, based upon at least one of the secondary chamber pressure sensor reading, and the secondary chamber temperature sensor reading.

2. The method of claim 1, further comprising:
   calculating, by the controller, a displaced volume of the primary gas chamber;
   calculating, by the controller, a displaced volume of the secondary gas chamber; and
   issuing, by the controller, a servicing message.

3. The method of claim 1, wherein the primary chamber temperature sensor reading is measured at a shock strut stroke of zero, wherein the shock strut stroke of zero corresponds to a maximum extension of the dual-stage, separated gas/fluid shock strut.

4. The method of claim 3, wherein the secondary chamber temperature sensor reading is measured at the shock strut stroke of zero.

5. The method of claim 1, wherein the shock strut stroke at which the secondary gas chamber is activated comprises a maximum shock strut stroke at which the primary chamber pressure is less than or equal to a secondary chamber inflation pressure.

6. The method of claim 1, wherein the shock strut stroke at which the secondary gas chamber is activated is determined using a dynamic airspring curve of the primary gas chamber.

7. The method of claim 1, further comprising issuing, by the controller, a servicing message to a visual display, wherein the servicing message corresponds to the number of moles of gas in the secondary gas chamber.

8. The method of claim 1, further comprising issuing, by the controller, a servicing message to a visual display, wherein the servicing message corresponds to the number of moles of gas in the primary gas chamber.

9. The method of claim 1, further comprising issuing, by the controller, a servicing message to a visual display, wherein the servicing message corresponds to the volume of oil in the oil chamber.

* * * * *